US008515610B2

(12) United States Patent
Sung et al.

(10) Patent No.: US 8,515,610 B2
(45) Date of Patent: Aug. 20, 2013

(54) NAVIGATION APPARATUS AND DRIVING ROUTE INFORMATION PROVIDING METHOD USING THE SAME AND AUTOMATIC DRIVING SYSTEM AND METHOD

(75) Inventors: Kyung Bok Sung, Daejeon (KR); Kyoung Hwan An, Daejeon (KR); Do Hyun Kim, Daejeon (KR); Jungsook Kim, Daejeon (KR); Jeong Dan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 695 days.

(21) Appl. No.: 12/696,617

(22) Filed: Jan. 29, 2010

(65) Prior Publication Data

US 2011/0066312 A1    Mar. 17, 2011

(30) Foreign Application Priority Data

Sep. 15, 2009    (KR) .................. 10-2009-0086737

(51) Int. Cl.
*G05D 1/00*    (2006.01)
*G01C 21/36*    (2006.01)

(52) U.S. Cl.
USPC ............... 701/23; 701/25; 701/410; 701/430

(58) Field of Classification Search
USPC ..... 701/23–25, 400, 408–410, 422, 428–430, 701/433, 437, 468, 444, 446, 458, 461, 469, 701/523; 340/995.25, 435, 904, 984, 995.14, 340/995.17, 995.18, 995.22, 995.24
See application file for complete search history.

(56) References Cited

U.S. PATENT DOCUMENTS

| 6,151,539 | A | 11/2000 | Bergholz et al. |
| 7,711,464 | B2 * | 5/2010 | Kaufmann ...................... 701/41 |
| 8,078,338 | B2 * | 12/2011 | Pack et al. ......................... 701/1 |
| 8,090,489 | B2 * | 1/2012 | Delean ........................... 701/24 |
| 8,280,573 | B2 * | 10/2012 | Sudou et al. .................... 701/25 |
| 2008/0161987 | A1 | 7/2008 | Breed |

FOREIGN PATENT DOCUMENTS

| JP | 2005-157689 | 6/2005 |
| KE | 10-2004-0006780 | 1/2004 |
| KR | 1998-054061 | 9/1998 |
| KR | 10-2000-0014783 | 3/2000 |
| KR | 10-2000-0043726 | 7/2000 |
| KR | 10-2006-0084289 | 7/2006 |
| KR | 10-2009-0076270 | 7/2009 |

* cited by examiner

*Primary Examiner* — Richard M. Camby
(74) *Attorney, Agent, or Firm* — Staas & Halsey LLP (57) ABSTRACT

An automatic driving system includes: a reference driving information database for storing reference driving information including reference driving lines, reference driving speeds, and lane change information; and a navigation apparatus for searching a driving route from a starting point to a destination by using a position value of a vehicle and generating driving route information by reflecting the reference driving information in the searched driving route. The automatic driving system further includes a vehicle controller for determining a driving line and a driving speed by using the generated driving route information and performing unmanned automatic driving along the determined driving line at the determined driving speed.

20 Claims, 6 Drawing Sheets

NAVIGATION APPARATUS AND DRIVING ROUTE INFORMATION PROVIDING METHOD USING THE SAME AND AUTOMATIC DRIVING SYSTEM AND METHOD

CROSS-REFERENCE(S) TO RELATED APPLICATION

The present invention claims priority of Korean Patent Application No. 10-2009-0086737, filed on Sep. 15, 2009, which is incorporated herein by reference.

FIELD OF THE INVENTION

The present invention relates to a technique of automatic driving using driving route information, and more particularly, to a navigation apparatus and a driving route information providing method using the same, and an automatic driving system and method, which are suitable for unmanned automatic driving using driving route information of the navigation apparatus.

BACKGROUND OF THE INVENTION

As well-known in the art, an automatic driving apparatus for automatic driving through driving location search is mainly applied to ships, airplanes and the like. Recently, the automatic driving apparatus is also applied to vehicles running on roads to inform a user of various information, such as driving route, degree of road congestion and the like, through a monitor, or to allow the automatic driving apparatus to drive a vehicle on its own or control a driving state.

In recent years, there has been ongoing research on an unmanned automatic driving apparatus. Such an unmanned automatic driving apparatus is able to perform automatic driving in an unmanned mode by detecting a drivable section by using, e.g., a radar, a ridar, an image sensor and the like, identifying the current position of the unmanned automatic driving apparatus using a global positioning system (GPS), and then generating a driving route of a vehicle for automatically driving to a destination in real time.

For such unmanned automatic driving, a function of finding a drivable section using various types of sensors (e.g., a radar, a ridar, an image sensor or the like) is necessarily required, and, in addition, a function of generating an overall driving route from a starting point to a destination, a function of generating a detailed driving route in a certain section, and a function of detecting and avoiding an obstacle in a driving section are required.

However, the automatic driving apparatus has not been commercialized yet because it needs a high-performance process capable of performing the above-described functions. Further, the automatic driving system has a reliability subject to be commercialized. That is, the automatic driving apparatus needs to recognize a driving environment and detect other vehicles in the vicinity in a moving state to be commercialized. However, an object, such as a vehicle, and its background may not be discriminated accurately which leads to frequent errors in tracking an object, and it is often the case that a moving object is mistakenly recognized due to changes in lighting.

SUMMARY OF THE INVENTION

In view of the above, the present invention provides a navigation apparatus and a driving route information providing method using the same, and an automatic driving system and method, which allow unmanned automatic driving using driving route information reflecting reference driving information, the reference driving information including a reference driving line and a reference driving speed and being built in a database.

In accordance with a first aspect of the present invention, there is provided a navigation apparatus including: a global positioning system (GPS) receiver for receiving a position value of a vehicle from a satellite; and a control unit for searching a driving route from a starting point to a destination by using the received position value and generating driving route information for unmanned automatic driving by reflecting reference driving information including a reference driving line and a reference driving speed in the searched driving route.

In accordance with a second aspect of the present invention, there is provided a method for providing a driving route using a navigation apparatus. The method includes: searching a driving route from a starting point to a destination by using a position value of a vehicle; and generating driving route information by reflecting reference driving information including a reference driving line and a reference driving speed in the searched driving route.

In accordance with a third aspect of the present invention, there is provided an automatic driving system including: a reference driving information database for storing reference driving information including reference driving lines, reference driving speeds, and lane change information; a navigation apparatus for searching a driving route from a starting point to a destination by using a position value of a vehicle and generating driving route information by reflecting the reference driving information in the searched driving route; and a vehicle controller for determining a driving line and a driving speed by using the generated driving route information and performing unmanned automatic driving along the determined driving line at the determined driving speed.

In accordance with a fourth aspect of the present invention, there is provided an automatic driving method including: searching a driving route from a starting point to a destination using a position value of a vehicle; generating driving route information by reflecting reference driving information containing a reference driving line and a reference driving speed in the searched driving route; determining a driving line and a driving speed using the generated driving route information; and performing unmanned automatic driving along the determined driving line at the determined driving speed.

BRIEF DESCRIPTION OF THE DRAWINGS

The objects and features of the present invention will become apparent from the following description of preferred embodiments, given in conjunction with the accompanying drawings, in which.

DETAILED DESCRIPTION OF THE EMBODIMENTS

Hereinafter, embodiments of the present invention will be described in detail with the accompanying drawings which form a part hereof.

Figure 1:
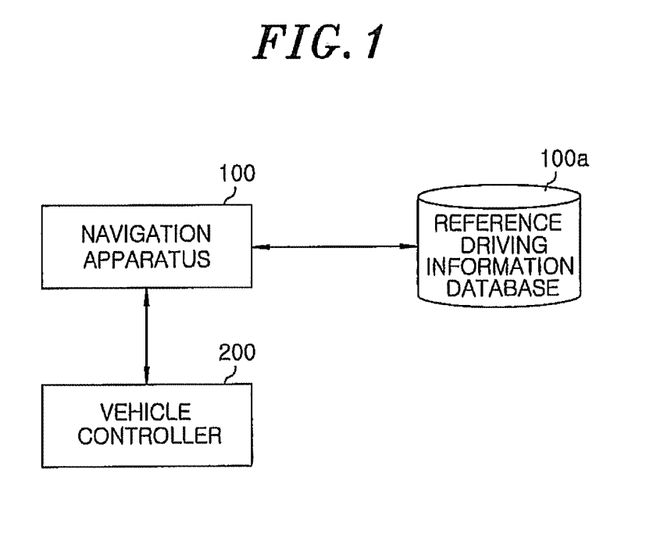
FIG. 1 shows a block diagram of an automatic driving system suitable for unmanned automatic driving based on driving route information reflecting reference driving information in accordance with an embodiment of the present invention.

FIG. 1 shows a block diagram of an automatic driving system for unmanned automatic driving based on driving route information reflecting reference driving information in accordance with the embodiment of the present invention. The automatic driving system includes a navigation apparatus 100, a reference driving information database 100a, and a vehicle controller 200.

The navigation apparatus 100 searches and generates a driving route from a starting point to a destination using a GPS signal to provide the driving route information.

That is, a driving route from the current position (or a starting point) to a destination is searched and generated by mapping a position value (i.e., GPS signal) based on a GPS signal with pre-stored map data and mapping sensed values of rotation angle and speed with the map data. Also, driving route information including, e.g., driving route, reference driving line, reference driving speed, lane change information and the like, is generated by reflecting reference driving information such as reference driving line, reference driving speed, lane change information and the like stored in the reference driving information database 100a in the corresponding driving route. The driving route information is then provided to the vehicle controller 200.

Here, when the reference driving information is reflected in the generated driving route, the navigation apparatus 100 divides the driving route into multiple sections with respect to a direction change point, e.g., an intersection, and reflect the reference driving line, reference driving speed and the like in each driving route corresponding to each section. Also, the navigation apparatus 100 includes lane change information in the driving route information when the lane change is required at a direction change point.

In addition, the navigation apparatus 100 needs to detect the correct position of a vehicle for unmanned driving. To this end, the navigation apparatus 100 detects the correct position of a vehicle by using a differential GPS (DGPS) method, a real time kinematics (RTK) method or the like, for example.

The reference driving information database 100a stores, as reference driving information, reference driving lines, reference driving speeds, lane change information and the like that can be mapped with map data. Here, each of the reference driving lines corresponds to each lane in a road and refers to a line that allows a vehicle running along the lane to travel without drifting from the lane. The reference driving speed allows the vehicle to travel along the reference driving line at the driving speed. The reference driving line can be stored, e.g., as a line that connects an average driving path of a vehicle or connects the center points of each lane. The reference driving speed can be stored as an average speed, a design speed or the like on a corresponding road. In addition, lane change information for a section requiring a lane change from a direction change point (e.g., intersection) may be stored in the database 100a.

Additionally, the reference driving information database 100a stores reference driving information for each road and for each lane, the reference driving information to be divided into at least two or be combined with another lane at a point (e.g., intersection) where a lane is divided or combined. For example, the reference driving information includes center points of a lane, average driving path of each vehicle. The reference driving information may further include a road width, lane position information on the road. Further, the reference driving information can be created and stored for a road without lanes as well. Accordingly, it is possible to perform unmanned automatic driving using lane position information depending on the type of a vehicle. Of course, a lane drift warning service may be provided to a vehicle running in an unmanned automatic mode by using such lane position information.

Figure 4A:
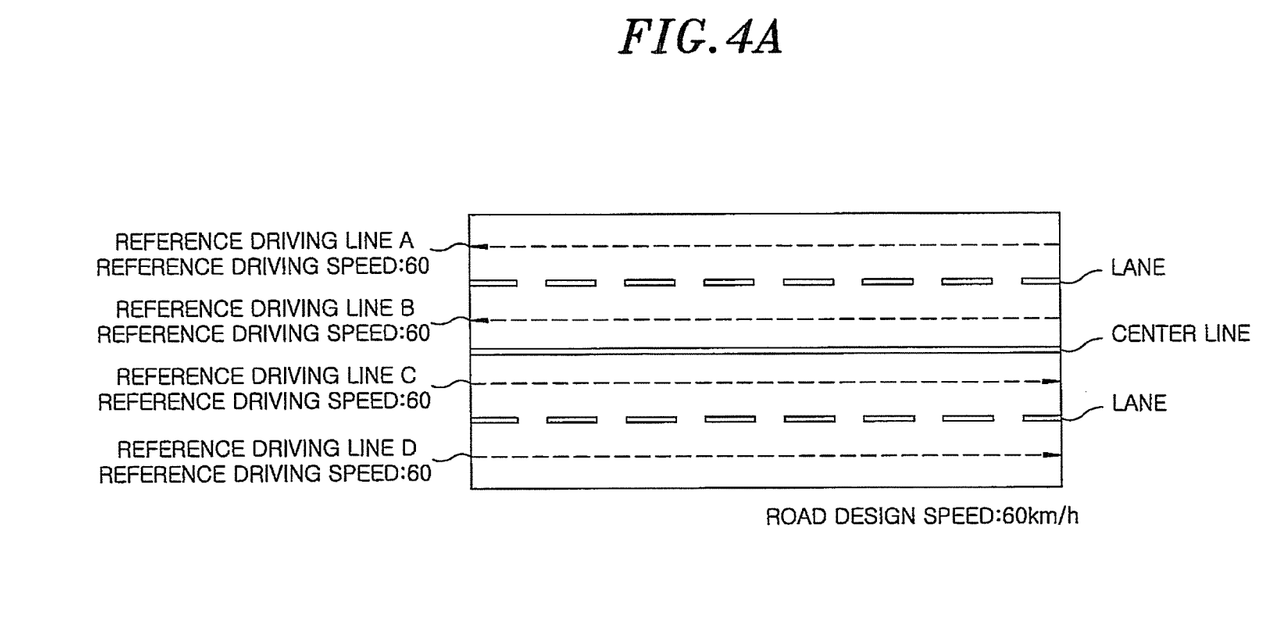
FIG. 4A is a view illustrating reference driving information based on the center line and design speed of a road for a certain section in accordance with the embodiment of the present invention.

In one example, FIG. 4A is a view illustrating reference driving information for a certain section in accordance with an embodiment of the present invention, which shows reference driving information of a two-way, two-lane road, whose road design speed is 60 km/h. It can be seen that, for four lane segments partitioned off by a center line and lanes, lines A to D each of which connects the center points of each lane are indicated as reference driving lines. Thus, it can be seen that respective reference driving speeds of the driving lines A to D are set to 60 km/h which is the design speed of the corresponding road.

Figure 4B:
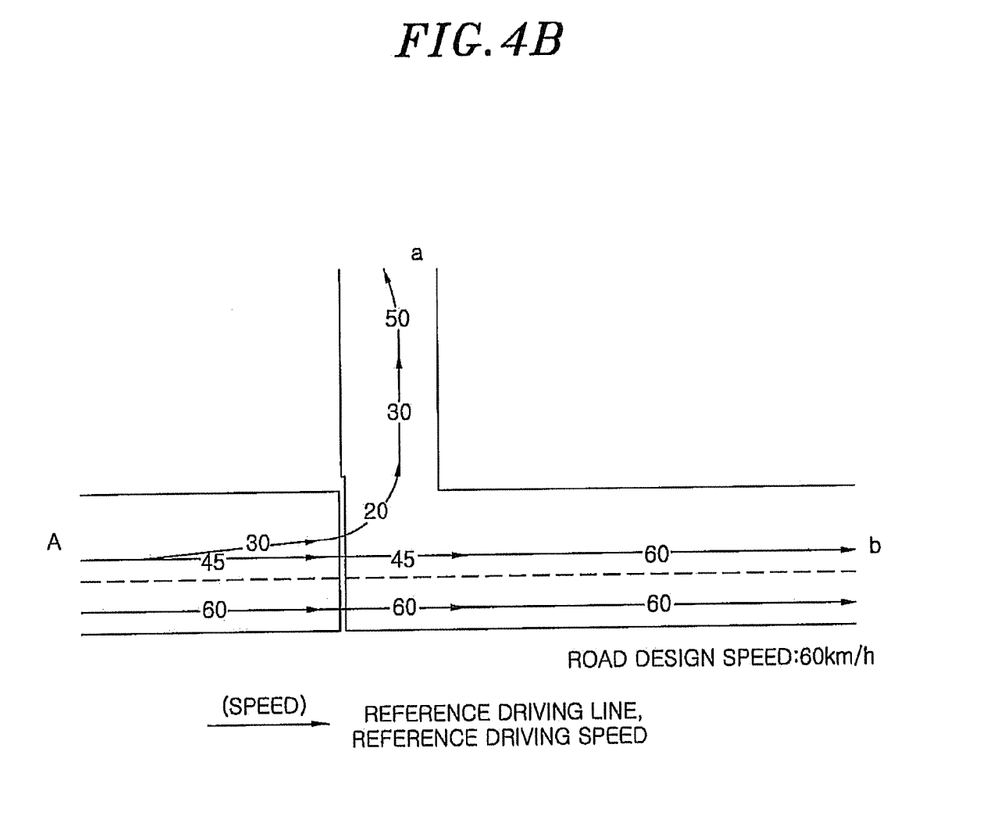
FIG. 4B is a view illustrating reference driving information based on an average driving path and average speed of a vehicle for a certain section in accordance with the embodiment of the present invention.

In another example, FIG. 4B is a view illustrating reference driving information for a certain section in accordance with an embodiment of the present invention, which shows reference driving information of a one-way, two-lane road and a left-turn section whose road design speed is 60 km/h. Solid lines with arrows represent reference driving lines, and numbers in each solid line represents reference driving speeds. As a result of setting the reference driving lines to be the average driving path of a vehicle and setting the reference driving speed of each reference driving line to be the average speed of the vehicle, it can be seen that the reference driving line for a second lane is a straight line and the reference driving speed for the second lane is constant at 60 km/h, while the reference driving line and reference driving speed for a first lane during a straight-ahead driving are different from those during a left turn. It can be confirmed that, in the case of the straight-ahead driving, the reference driving speed of the first lane was 45 km/h and then goes up to 60 km/h after passing the left-turn section, while in the case of the left-turn, the reference driving speed approaches 30 km/h and then is reduced to 20 km/h during a turn, and then is accelerated to 30 km/h and then 50 km/h after the turn. In this way, two or more reference driving lines and two or more reference driving speeds can be set for one section, and different reference driving lines and difference reference driving speeds can be selected based on the driving route of the vehicle.

The vehicle controller 200 determines a driving line and a driving speed depending on driving route information to perform unmanned automatic driving. That is, the vehicle controller 200 receives the driving route information reflecting the reference driving information from the navigation apparatus 100 and determines a driving line and a driving speed using this information, and then controls the vehicle to perform unmanned driving along the determined driving line at the determined driving speed based on the driving route information. Here, the control of the vehicle should be understood to encompass all vehicle controls including, e.g., acceleration, deceleration, steering and the like.

The vehicle controller 200 can modify the driving line, the driving speed or the like for each section by reflecting the characteristics (e.g., vehicle length, turning radius and the like) of the corresponding vehicle in determining the driving line and the driving speed using the driving route information, thus preventing the vehicle from drifting from the driving route on the basis of the vehicle characteristics.

Therefore, relevant unmanned automatic driving can be effectively performed by searching and generating a driving route from a starting point to a destination, generating driving route information by reflecting reference driving information including a reference driving line and a reference driving speed in the generated driving route, and determining the driving line and the driving speed based on the generated driving route information.

Further, the reference driving information database 100a set forth in the above-described embodiment of the present invention can be included in a separate storage medium connected to the navigation apparatus 100 or in a built-in storage medium, or can be stored and managed in an information server, a data center, or the like connected to the navigation apparatus 100 via a wired/wireless communication network to provide reference driving information upon request from the navigation apparatus 100.

Next, a description will be made of a navigation apparatus in which the automatic driving system having the aforementioned configuration searches and generates a driving route from a starting point to a destination, and generates driving route information by reflecting reference driving information including a reference driving line and a reference driving speed in the generated driving route.

Figure 2:
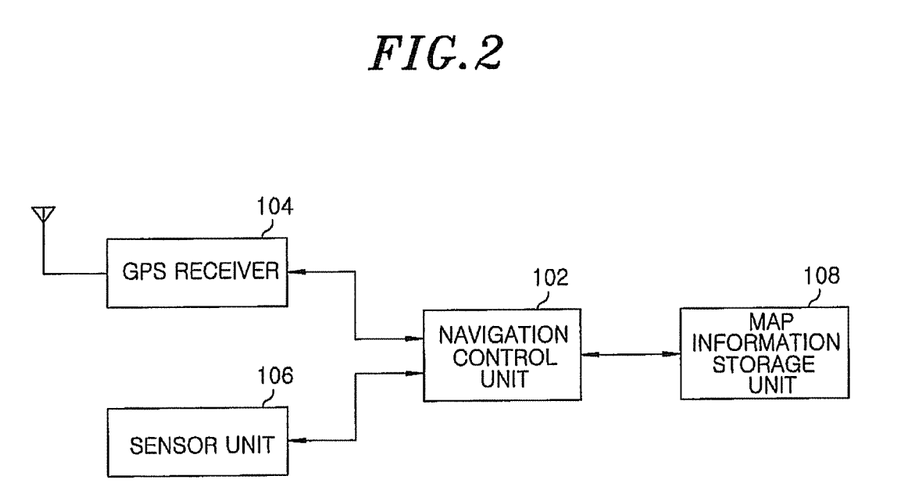
FIG. 2 illustrates a block diagram of a navigation apparatus suitable to generate and provide driving route information reflecting reference driving information in accordance with the embodiment of the present invention.

FIG. 2 illustrates a block diagram of a navigation apparatus for generating and providing driving route information reflecting reference driving information in accordance with an embodiment of the present invention. The navigation apparatus includes a navigation control unit 102, a GPS receiver 104, a sensor unit 106, and a map information storage unit 108.

Referring to FIG. 2, the control unit 102 includes a microprocessor and the like to control the overall operation of the navigation apparatus 100. The control unit 102 performs the function of searching and generating a driving route by mapping a position value (i.e., GPS signal) of the navigation apparatus 100 (i.e., the vehicle having the navigation apparatus 100 mounted thereon) provided from the GPS receiver 104 with map data stored in the map information storage unit 108 and mapping sensed values of the rotation angle and speed of the navigation apparatus 100 provided from the sensor unit 106 with the map data. Here, the control unit 102 needs to detect the correct position of the vehicle. To this end, the control unit 102 can detect the correct position of the vehicle by using the DGPS method, an RTK method and the like, as described above.

In addition, the control unit 102 searches and detects driving route candidates from the current position (or starting point) to the destination by mapping the position value provided from the GPS receiver 104 with the map data stored in the map information storage unit 108 when the destination is entered, and generates a certain driving route by considering a driving time (i.e., time required), a search priority (e.g., priority to freeways, priority to local highways or the like) and the like for each of the driving route candidates. Next, driving route information (e.g., a driving route, a reference driving line, a reference driving speed, lane change information, etc.) for the driving route is generated by reflecting the reference driving line, reference driving speed, lane change information and the like stored in the reference driving information database 100a, and then provides the driving route information to the vehicle controller 200.

At this point, in a case the reference driving information is reflected in the generated driving route, the control unit 102 divides the driving route into multiple sections with respect to a direction change point, e.g., an intersection, reflects the reference driving line, reference driving speed and the like in each driving route corresponding to each section and generates lane change information when the lane change is required at a direction change point, wherein the lane change information is added in the driving route information and generated.

The GPS receiver 104 calculates the position value of the navigation apparatus 100 by using the satellite signal received through an antenna from multiple artificial satellites and transmits the position value to the control unit 102.

The sensor unit 106 includes, e.g., a Gyro sensor, a speed sensor or the like and senses and estimates the rotation angle, speed and the like of the navigation apparatus 100, and transmits sensed values of the rotation angle, speed and the like to the control unit 102.

The map information storage unit 108 is a storage medium, such as a hard disk drive (HDD), and stores and manages various map information for providing a route search and navigation service and various voice guidance information for providing voice guidance. If required, the information are extracted and provided to the control unit 102.

Therefore, driving route information for unmanned automatic driving of the vehicle can be effectively provided to the vehicle controller by searching and generating a driving route from a starting point to a destination and generating driving route information by reflecting reference driving information including a reference driving line and a reference driving speed in the generated driving route.

Next, a description will be made on a process of searching and generating a driving route from a starting point to a destination; generating driving route information by reflecting reference driving information containing a reference driving line and a reference driving speed in the generated driving route; determining a driving line and a driving speed based on the generated driving route information; and performing unmanned automatic driving.

Figure 3:
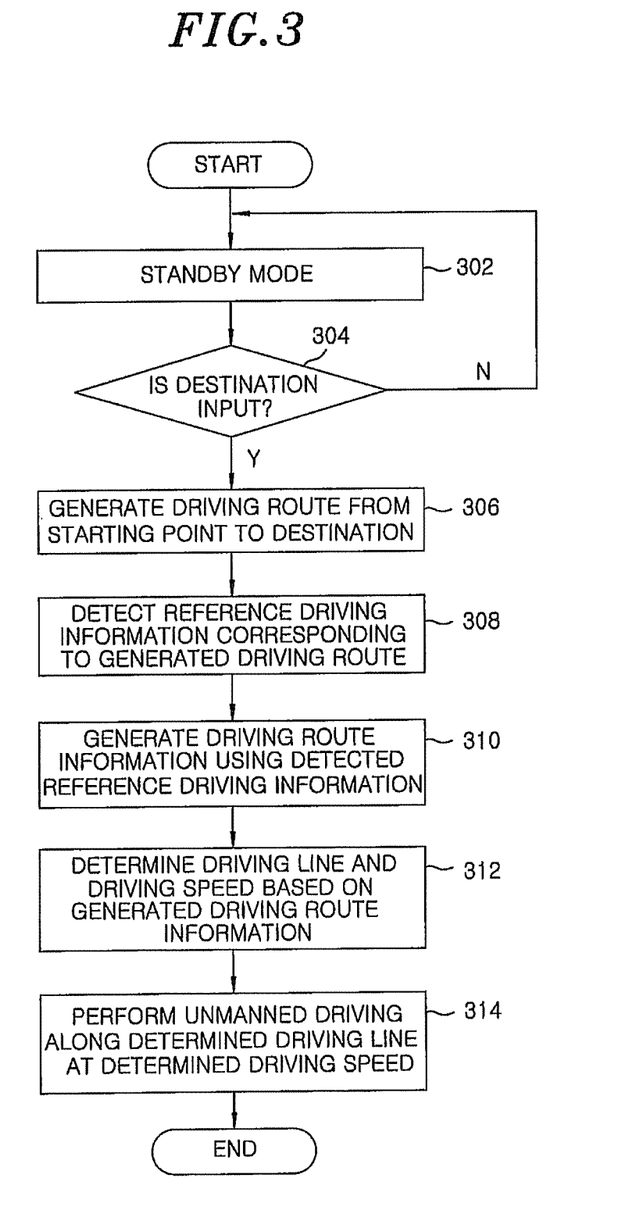
FIG. 3 provides a flowchart showing a process of unmanned automatic driving based on driving route information reflecting reference driving information in accordance with the embodiment of the present invention.

FIG. 3 is a flowchart describing a process of unmanned automatic driving based on driving route information reflecting reference driving information in accordance with an embodiment of the present invention.

Referring to FIG. 3, in a standby mode of an automatic driving system at step 302, the navigation apparatus 200 checks if a destination of unmanned automatic driving has been input at step 304. Here, both a starting point and a destination of the unmanned automatic driving or only a destination can be input. If only a destination is input, the current position of a vehicle having the navigation apparatus 100 mounted thereon can be recognized as a starting point. Here, the navigation apparatus 100 detects the correct position of the vehicle by using the DGPS method, the RTK method or the like.

As a result of the check at step 304, if a destination of the unmanned automatic driving is input, the navigation apparatus 100 searches and generates a driving route from the current position (or starting point) to the destination by mapping a position value based on a GPS signal with prestored map data depending on the input destination (or the starting point and the destination) and mapping sensed values of rotation angle and speed with the map data at step 306.

Figure 5A:
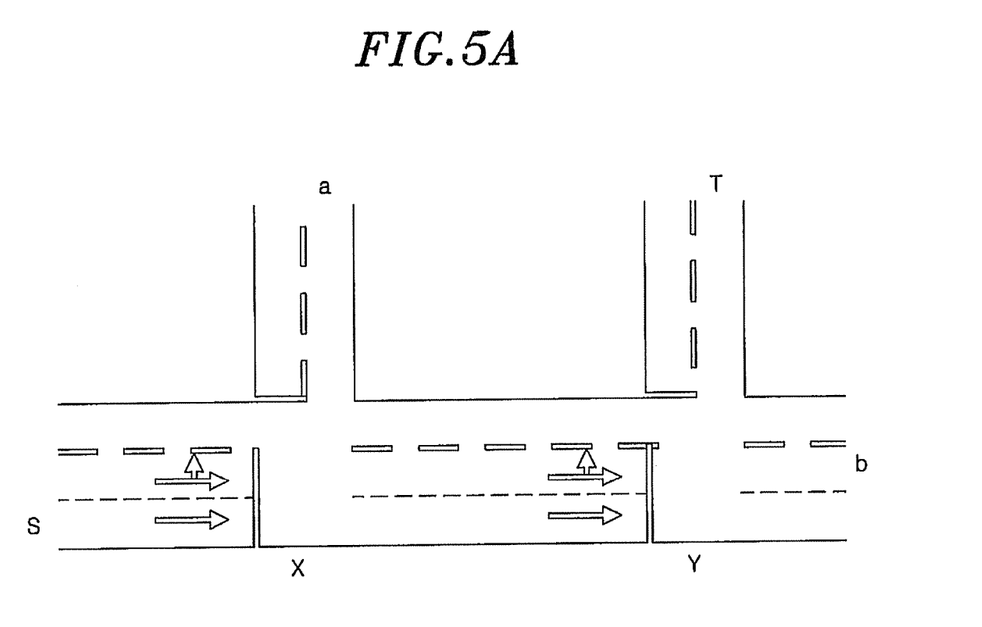
FIGS. 5A and 5B are views illustrating an actual road configuration and a logical road configuration in accordance with the embodiment of the present invention.
Figure 5B:
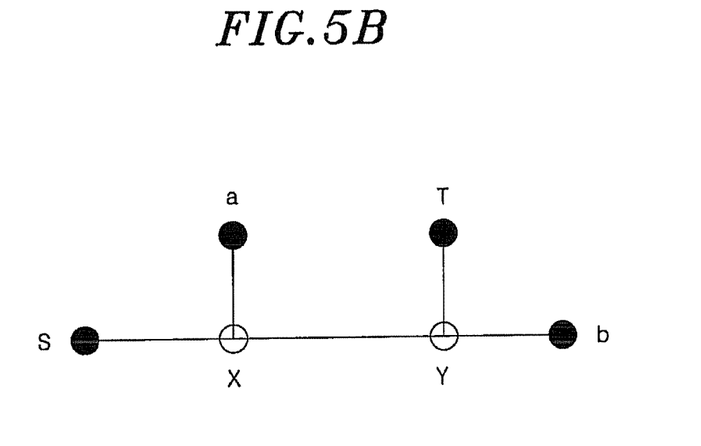

As an example of searching and generating a driving route, FIGS. 5A and 5B are views illustrating an actual road configuration and a logical road configuration in accordance with an embodiment of the present invention. When the starting point is S (start) and the destination is T (target) on the road shown in FIG. 5A, the driving route searched and generated by the navigation apparatus 100 is S-X-Y-T, which can be represented as shown in FIG. 5B in a logical network configuration.

Next, at step 308, the navigation apparatus 100 detects reference driving information corresponding to the generated driving route from the reference driving information database 100a.

Here, the reference driving information database 100a stores, as reference driving information, reference driving lines, reference driving speeds, lane change information and the like that can be mapped with map data. The reference driving line is stored, e.g., as a line that connects the average driving path of a vehicle or connects the center points of each lane, and the reference driving speed is stored as the average speed, design speed and the like on a corresponding road. In addition, lane change information for a section requiring a lane change at a direction change point such as an intersection is stored in the reference driving information database 100a.

Subsequently, at step 310, the navigation apparatus 100 generates driving route information including a driving route, a reference driving line, a reference driving speed, lane change information and the like by reflecting the detected reference driving information in the corresponding driving route, and provides the driving route information to the vehicle controller 200. At this point, in case the reference driving information is reflected in the generated driving route, the driving route can be divided into multiple sections with respect to a direction change point, e.g., an intersection, the reference driving line, reference driving speed and the like are reflected in each driving route corresponding to each section, and lane change information is generated for a section when the lane change is required at a direction change point. The lane change information is added in the driving route information.

Figure 6:
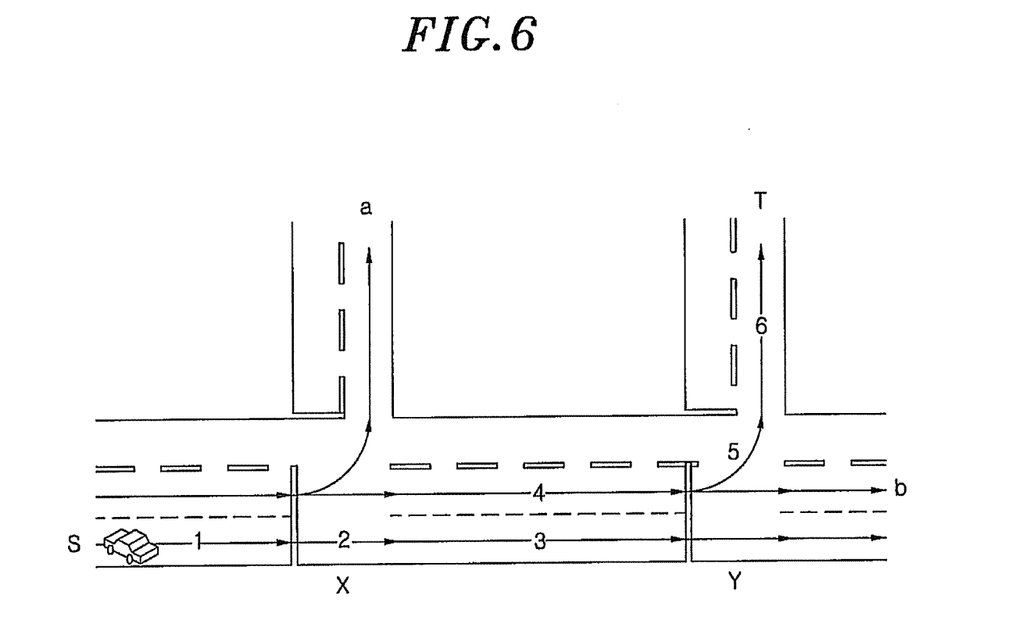
FIG. 6 is a view illustrating a driving route in which a reference driving line is reflected in accordance with the embodiment of the present invention.

FIG. 6 is a view illustrating a driving route in which a reference driving line is reflected in a corresponding driving route in accordance with an embodiment of the present invention. That is, the drawing shows a case in which the reference driving information detected from the reference driving information database 100a is reflected in the driving route. When driving route information is generated by reflecting a reference driving line and lane change information to the driving route from a starting point S to a destination T on the road shown in FIG. 5A, it can be seen that the driving route is divided into an S-X-Y section and an X-Y-T section depending on a direction change point. Here, a driving route in the S-X-Y section is 1-2-3 and a driving route of the X-Y-T section is 4-5-6. When moving from the S-X-Y section to the X-Y-T section, lane change information at a section (i.e., X-Y section) requiring a lane change is recorded to thus generate the route to 3-4.

Thereafter, the vehicle controller 200 receives the driving route information reflecting the reference driving information from the navigation apparatus 100 and determines a driving line and a driving speed using the driving route information at step 312. The vehicle controller 200 modifies the driving line and driving speed for each section by reflecting the characteristics (e.g., vehicle length, turning radius and the like) of the corresponding vehicle in determining the driving line and the driving speed using the driving route information, thus preventing the vehicle from drifting from the driving route depending on the vehicle characteristics.

Next, at step 314, the vehicle controller 200 controls the vehicle to perform unmanned driving along the determined driving line at the determined driving speed based on the driving route information. Here, the control of the vehicle should be understood to encompass vehicle controls including, e.g., acceleration, deceleration, steering and the like.

Accordingly, unmanned automatic driving can be effectively performed by searching and generating a driving route from a starting point to a destination, generating driving route information by reflecting reference driving information including a reference driving line and a reference driving speed in the generated driving route, and then determining the driving line and the driving speed based on the generated driving route information.

While the invention has been shown and described with respect to the preferred embodiments, it will be understood by those skilled in the art that various changes and modifications may be made without departing from the scope of the invention as defined in the following claims.

What is claimed is:

1. A navigation apparatus comprising:
a global positioning system (GPS) receiver for receiving a position value of a vehicle from a satellite; and
a control unit for searching a driving route from a starting point to a destination by using the received position value and generating driving route information for unmanned automatic driving by reflecting reference driving information including a reference driving line and a reference driving speed in the searched driving route, wherein the reference driving information is built in a database.

2. The navigation apparatus of claim 1, wherein the control unit divides the driving route into multiple sections with respect to a direction change point and generates the driving route information by reflecting the reference driving line and the reference driving speed in each of the sections.

3. The navigation apparatus of claim 2, wherein the control unit additionally records lane change information for each of the sections in the driving route information.

4. The navigation apparatus of claim 1, wherein the reference driving line is generated by using an average driving path or a line connecting center points of each lane.

5. The navigation apparatus of claim 1, wherein the reference driving speed is generated by using an average speed or design speed of each road.

6. A method for providing a driving route using a navigation apparatus, comprising:
searching a driving route from a starting point to a destination by using a position value of a vehicle; and
generating driving route information by reflecting reference driving information including a reference driving line and a reference driving speed in the searched driving route, wherein the reference driving information is built in a database.

7. The method of claim 6, wherein, in said generating driving route information, the driving route is divided into multiple sections with respect to a direction change point and the driving route information is generated by reflecting the reference driving line and the reference driving speed in each of the sections.

8. The method of claim 7, wherein, in said generating driving route information, lane change information for each of the sections is additionally recorded in the driving route information.

9. The method of claim 6, wherein the reference driving line is generated by using an average driving path or a line connecting center points of each lane.

10. The method of claim 6, wherein the reference driving speed is generated by using an average speed or design speed of each road.

11. An automatic driving system comprising:
a reference driving information database for storing reference driving information including reference driving lines, reference driving speeds, and lane change information;
a navigation apparatus for searching a driving route from a starting point to a destination by using a position value of a vehicle and generating driving route information by reflecting the reference driving information in the searched driving route; and
a vehicle controller for determining a driving line and a driving speed by using the generated driving route information and performing unmanned automatic driving along the determined driving line at the determined driving speed.

12. The automatic driving system of claim 11, wherein the navigation apparatus divides the driving route into multiple sections with respect to a direction change point and generates the driving route information by reflecting the reference driving line and the reference driving speed in each of the sections and additionally records lane change information for each of the sections in the driving route information.

13. The automatic driving system of claim 12, wherein the vehicle controller modifies the driving line and driving speed for each of the sections by reflecting a length or turning radius of the vehicle.

14. The automatic driving system of claim 11, wherein the reference driving line is generated by using an average driving path or a line connecting the center points of each lane.

15. The automatic driving system of claim 11, wherein the reference driving speed is generated by using an average speed or design speed of each road.

16. An automatic driving method comprising:
searching a driving route from a starting point to a destination using a position value of a vehicle;
generating driving route information by reflecting reference driving information containing a reference driving line and a reference driving speed in the searched driving route, wherein the reference driving information is built in a database;
determining a driving line and a driving speed using the generated driving route information; and
performing unmanned automatic driving along the determined driving line at the determined driving speed.

17. The automatic driving method of claim 16, wherein, in said generating driving route information, the driving route is divided into multiple sections with respect to a direction change point, the driving route information is generated by reflecting the reference driving line and the reference driving speed in each of the sections and lane change information are additionally recorded for each of the sections in the driving route information.

18. The automatic driving method of claim 17, wherein, in said determining a driving line and a driving speed, the driving line and driving speed for each of the sections are modified by reflecting a length or turning radius of the vehicle.

19. The automatic driving method of claim 16, wherein the reference driving line is generated by using an average driving path or a line connecting the center points of each lane.

20. The automatic driving method of claim 16, wherein the reference driving speed is generated by using an average speed or design speed of each road.

* * * * *